(12) United States Patent
Ghaboussi et al.

(10) Patent No.: US 8,095,344 B2
(45) Date of Patent: *Jan. 10, 2012

(54) METHODS AND SYSTEMS FOR MODELING MATERIAL BEHAVIOR

(75) Inventors: Jamshid Ghaboussi, Urbana, IL (US);
Youssef M. A. Hashash, Urbana, IL (US); David Pecknold, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/250,936

(22) Filed: Oct. 14, 2008

(65) Prior Publication Data

US 2009/0112489 A1 Apr. 30, 2009

Related U.S. Application Data

(62) Division of application No. 10/409,882, filed on Apr. 9, 2003, now Pat. No. 7,447,614.

(60) Provisional application No. 60/371,095, filed on Apr. 9, 2002.

(51) Int. Cl.
*G06F 7/60* (2006.01)

(52) U.S. Cl. .................................. 703/2; 702/7; 702/42

(58) Field of Classification Search ........ 703/2; 702/42, 702/6, 7; 706/16, 25; 73/9, 818
See application file for complete search history.

(56) References Cited

U.S. PATENT DOCUMENTS 6,397,168 B1 5/2002 Plecnik et al.
6,664,067 B1 * 12/2003 Hajduk et al. ................. 435/7.1
6,679,130 B2 * 1/2004 Hajduk et al. .................. 73/866
7,246,047 B2 * 7/2007 Ghaboussi et al. ............... 703/2
2002/0023507 A1 * 2/2002 Hajduk et al. .................. 73/866
2003/0195725 A1 10/2003 Hashash
2003/0216895 A1 11/2003 Ghaboussi et al.

OTHER PUBLICATIONS

American Society for Testing and Materials, "Standard Test Method for Mechanical Cone Penetration Tests of Soil," pp. 1-5. (Jan. 1999).
American Society for Testing and Materials, "Standard Test Method for Penetration Test and Split-Barrel Sampling of Soils," pp. 1-5. (Mar. 1999).
Carillo et al., A. "Design of a Large Scale Discrete Element Soil Model for High Performance Computing Systems," Proceedings of the 1996 ACM/IEEE Conference on Supercomputing (CDROM), 0-89791-854-1.
Cundall, P.A. "A Computer model for simulating progressive, large scale movements in blocky rock systems," International Symposium on Rock Mechanics. (1971) ISRM, Nancy, France.

(Continued)

*Primary Examiner* — Russell Frejd
(74) *Attorney, Agent, or Firm* — Greer, Burns & Crain Ltd.

(57) ABSTRACT

A method for modeling material behavior includes using empirical three dimensional non-uniform stress and strain data to train a self-organizing computational model such as a neural network. A laboratory device for measuring non-uniform stress and strain data from material includes an enclosure with an inclusion in it. As the enclosure is compressed, the inclusion induces a non-uniform state of stress and strain. A field testing device includes a body having a moveable section. When the body is inserted in a material and the moveable section moved, a non-uniform state of stress and strain can be characterized.

33 Claims, 8 Drawing Sheets

OTHER PUBLICATIONS

Dijkstra et al., T.A. Particle Packing in Loess Deposits and the Problem of Structure Collapse and Hydroconsolidation, Engineering Geology, vol. 40, Nos. 1-2, Nov. 1995, pp. 49-64.

Femmam et al., S. "Perception and Characterization of Materials Using Signal Processing Techniques," IEEE Transactions on Instrumentation and Measurement, vol. 50, No. 5, Oct. 2001, pp. 1203-1211.

Ghaboussi, J., J.H. Garret, et al. (1991). "Knowledge-based modeling of material behaviour with neural networks." *Journal of Engineering Mechanics Division* 117(1): 132-153.

Ghaboussi, J., D.A. Pecknold, et al. (1998). "Autoprogressive training of neural network constitutive models." *International Journal for Numerical Methods in Engineering* 42(1): 105-126.

Ghaboussi, J & D.E. Sidarat (1997). *New method of material modeling using neural networks*. $6^{th}$ International Symposium on Numerical Models in Geomechanics.

Hashash, Y.M.A., J. Ghaboussi, S. Jung, and C. Marulanda. "Direct field calibration of model simulations of deep excavations," Plasticity, Damage and Fracture at Macro, Micro and Nano Scales, Plasticity (2002) Aruba: NEAT Press.

Hashash, Y.M.A. (1992). "Analysis of deep excavations in clay," Doctoral thesis submitted to Massachusetts Institute of Technology.

Hashash, Y.M.A. & A.J. Whittle (1996). "Ground Movement Prediction for Deep Excavations in soft Clay." *Journal of Geotechnical Engineering* 122(6): 474-486.

Knecht et al., R. Dynamic Load Balancing for the Simulation of Granular Materials, ACT SIGART Bulletin, ACM Press, Apr. 1995, pp. 184-189.

Lehner, V.D., "Real-time simulation of soil interaction and stability for an earth-moving equipment prototyping system," 1995. v, 56 leaves.

Xin Li and Michael Moshell, "Modeling Soil: Realtime Dynamic Models for Soil Slippage and Manipulation," pp. 1-9.

Moshell, J. Michael, Li, Xin et al. "Nap-of-Earth Flight and the Realtime/* Simulation of Dynamic Terrain," *Proceedings of International Society for Optical Engineering.* SPIE vol. 1289 Cockpit Displays and Visual Simulation ,Apr. 1990.

Prevost, J.H. & R. Popescu (1996). "Constitutive Relations for Soil Materials." *Electronic Journal for Geotechnical Engineering*.

Roscoe, K.H. & J.B. Burland (1968). "On the generalized stress-strain of "wet" clay." *Engineering Plasticity.* J. Heyman: 535-609.

Sidarta, D. & J. Ghaboussi (1998). "Constitutive Modeling of Geomaterials from Non-uniform Material Tests." *International Journal of Computers and Geotechnics* 22(1).

Singh, S. "Learning to Predict Resistive Forces During Robotic Excavation," IEEE International Conference on Robotics and Automation, vol. 2, May 1995, pp. 2102-2107.

Whittle, A.J., Y.M.A. Hashash, et al. (1993). "Analysis of deep excavation in Boston." *Journal of Geotechnical Engineering* 119(1): 69-90.

Wu et al., X. "Representation of Material Behavior: Neural Network-based Models," IJCNN International Joint Conference on Neural Networks, 1990, pp. 229-234.

\* cited by examiner

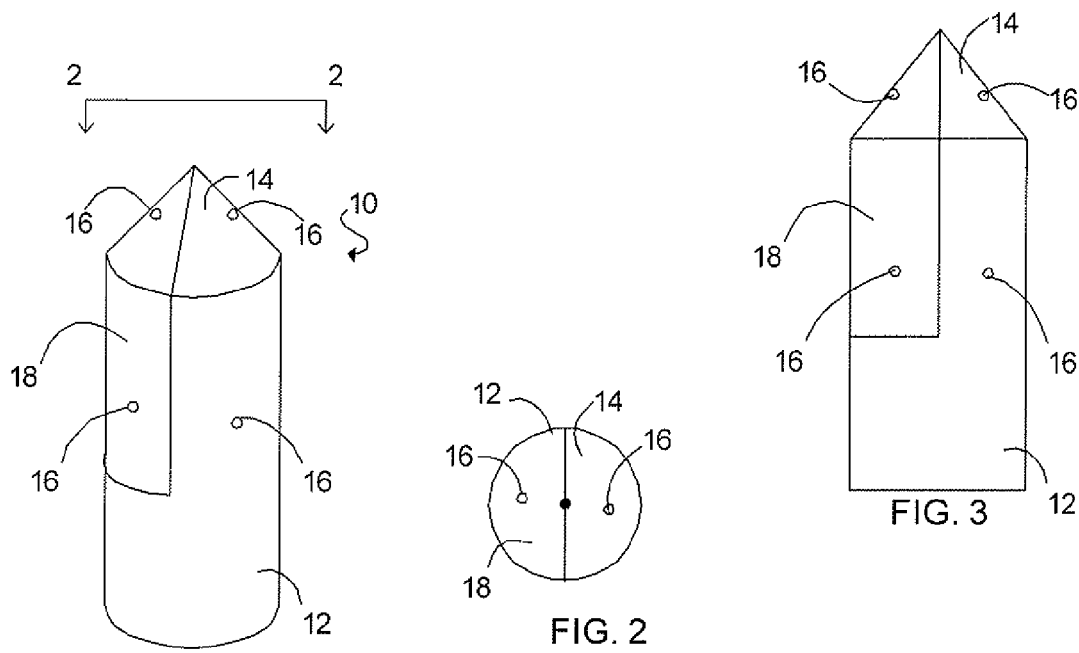
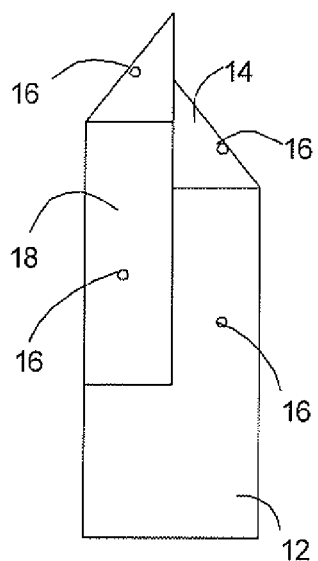
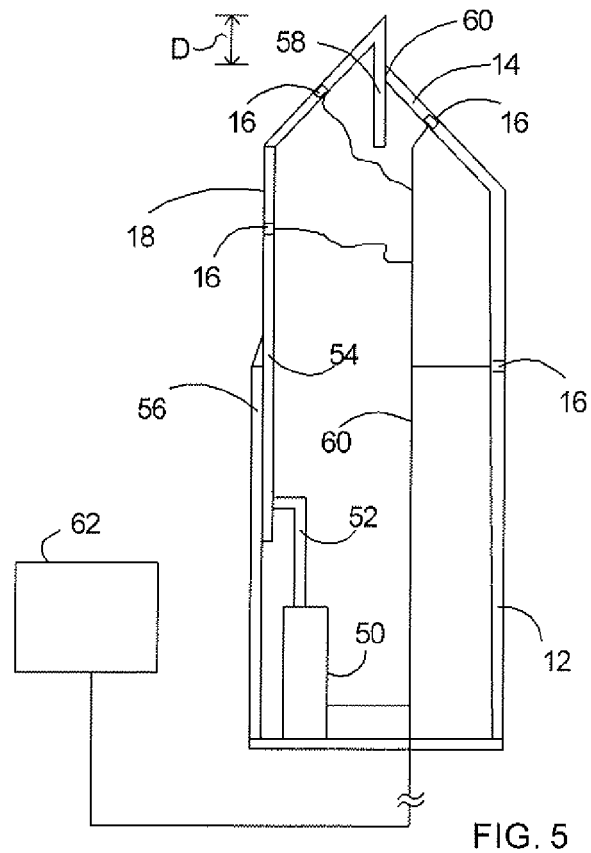
FIG. 1
FIG. 2
FIG. 3
FIG. 4
FIG. 5

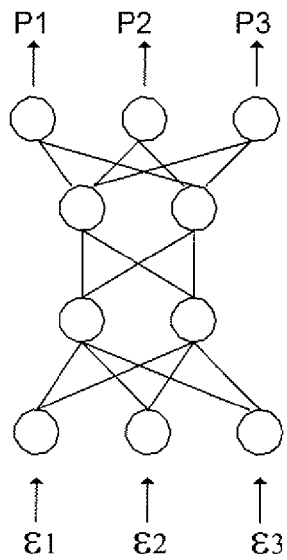
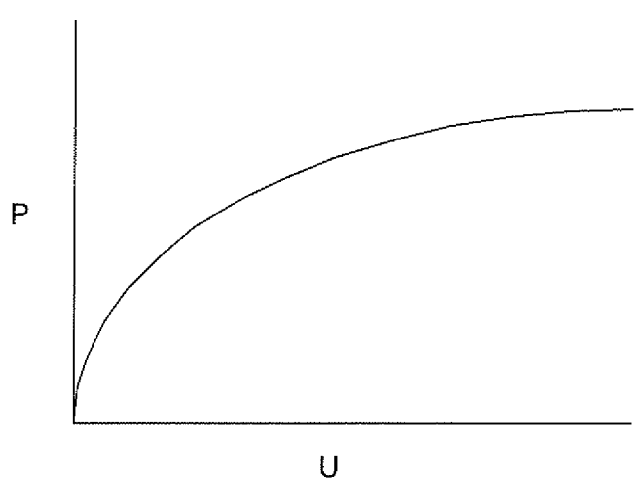
FIG. 12
FIG. 13
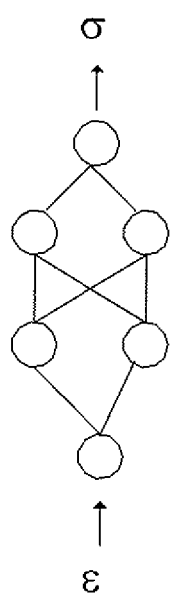
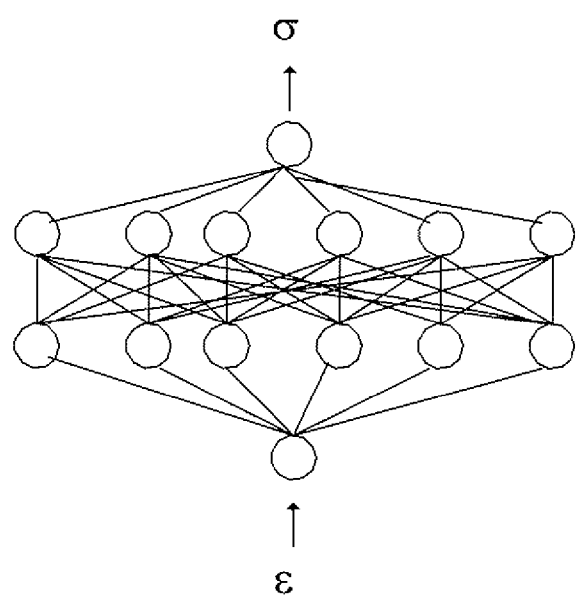
FIG. 14A
FIG. 14B

METHODS AND SYSTEMS FOR MODELING MATERIAL BEHAVIOR

PRIORITY CLAIM

This application is a divisional of application Ser. No. 10/409,882, now U.S. Pat. No. 7,447,614, filed Apr. 9, 2003, which claims priority of U.S. Provisional Application Ser. No. 60/371,095, filed Apr. 9, 2002 under 35 U.S.C. §119.

STATEMENT OF GOVERNMENT INTEREST

This invention was made with Government assistance under National Science Foundation Grant No. MSS 92-14910 and National Science Foundation Grant No. CMS 95-08462, and National Science Foundation Grant No. CMS 00-84556. The government has certain rights in the invention.

FIELD OF THE INVENTION

The present invention is related to methods and systems for modeling material behavior, including methods and systems for modeling stress and strain effects in soil.

BACKGROUND OF THE INVENTION

In current engineering practice, the design and construction of structures such as tunnels, underground sewers, underground parking garages, foundations, buildings, and the like often begin with a characterization of the engineering response of soil due to the proposed construction. A numerical model may be used to predict static and dynamic soil structure reaction to construction activities. Generally, the characterization may include performing laboratory or field testing of the soil, and using the resultant data to develop a numerical model of the soil behavior. The numerical model may then be used to predict soil response to construction activities.

Most soil numerical models include constitutive models to represent soil behavior at the point or "element" level and describe soil stress-strain-strength response. Most constitutive models used in geomechanics are based on the concepts of plasticity. Early forms of a yield criterion include the Tresca and von Mises yield criteria used to represent material failure. These models are useful to establish a general framework for understanding material behavior but do not capture the complex behavior of geologic materials including non-linearity, hardening and softening, anisotropy, and strain rate dependence.

These constitutive models define the material behavior using a fixed set of equations and geometric objects that define the yield surface. An advantage of these types of constitutive relations relates to model generalization. Using a limited set of laboratory tests, a set of hypotheses about the general stress strain behavior of soil, and conservation laws of mechanics, the model clearly defines stress strain behavior even in regions of stress and strain space not covered by data from laboratory tests. A disadvantage associated with these models is there relative inflexibility. A given constitutive model has very limited learning capacity through adjustment of model properties. The fundamental shape of the stress-strain relationship does not change.

The constitutive numerical model may be calibrated using laboratory and/or field test data may be used to at least partially define the boundary values. The data may represent boundary value data. A variety of computer codes are available for providing a model through a solution to the boundary value problem. For example, a finite element or a finite difference method can be used to solve equilibrium equations that govern the boundary value problem. Also, a reference library of material models may be used to simulate the constitutive behavior of the soil. This general process as currently known, however, leaves many problems unresolved.

The data obtained from current laboratory and/or field-testing procedures and apparatuses, for example, are often not sufficient as a basis for comprehensive modeling. Field-testing may be performed using devices that penetrate the soil and measure axisymmetric states of stress. These include the Standard Penetration Test (SPT) or the Cone Penetrometer Test (CPT). These devices are generally unable to obtain some data important for soil modeling, such as the soil friction angle. The strain path method is one example of a computational method that has been used before to interpret soil properties around a CPT, an SPT and other in field-testing devices. Although this technique can be used to interpret strains, it is unable to develop the stress-strain relationship unless data such as the soil friction angle is assumed.

Additional problems are presented in the extent of testing required using presently known apparatuses and methods. Soil behavior is highly anisotropic and is difficult to fully characterize using a single test device. Historically, a large number of laboratory tests have been required using a range of test devices to obtain even a limited characterization of the soil properties. Known test devices generally measure only uniform states of stress and strain, and include a triaxial test apparatus, a plane strain apparatus, a hollow cylinder apparatus, a direct shear apparatus, a true triaxial apparatus, and similar devices. It is not uncommon for tests using the devices to number over one hundred in order to obtain a comprehensive data set.

It is also known to utilize observation of soil behavior under actual construction conditions may to verify soil models that have been developed using data from field and/or laboratory tests. If the behavior predicted by the model appears to be inconsistent with field observations, the model may be "tweaked" or otherwise adjusted to better correlate to the observed results. In the prior art, however, these model adjustments have only been made on an ad-hoc basis, with the result that they may be inconsistent and not accurately applied. Also, many models developed using laboratory and/or field-testing do not have the flexibility to be readily adjusted.

These and other problems remain unresolved in the art.

SUMMARY OF THE INVENTION

The present invention is directed to methods and program products for modeling material behavior, as well as testing devices for testing material. One embodiment of the invention is directed to a method that includes steps of inducing a non-uniform state of stress and strain in a material sample using a testing device, and measuring sample data with the testing device. A subsequent method step includes training a self-organizing computational model with the data to learn a non-uniform behavior for the material. The empirical data may be obtained, for example, from a field-testing device or a laboratory-testing device. The present invention is also directed to devices for measuring empirical strain and stress data. An additional exemplary invention embodiment is directed to a field-testing device, and another to a laboratory-testing device.

Still an additional invention embodiment is directed to a method for modeling material behavior, and includes the steps of obtaining empirical stress strain data for the material over a period of time while the material is in a non-uniform state of stress and strain, and training a self-organizing computational model with the empirical data with the data to learn a non-uniform behavior for the material. These and other aspects of the present invention will be discussed in the Detailed Description and Drawings that follow.

BRIEF DESCRIPTION OF THE DRAWINGS

FIG. 1 is a schematic perspective of a preferred embodiment field-testing device of the invention;

FIG. 2 is a top plan view of the device of FIG. 1 viewed generally along the line 2-2;

FIG. 3 is a side elevational view of the device of FIG. 1;

FIG. 4 is the view of FIG. 3 with the device's moveable section extended;

FIG. 5 is a schematic cross section of the device of FIG. 1 with the moveable section extended;

FIG. 13 is a graph useful for illustrating autoprogressive training;

FIGS. 14A and 14B schematically illustrate a simple neural network before and after training;

DETAILED DESCRIPTION

Figure 6:
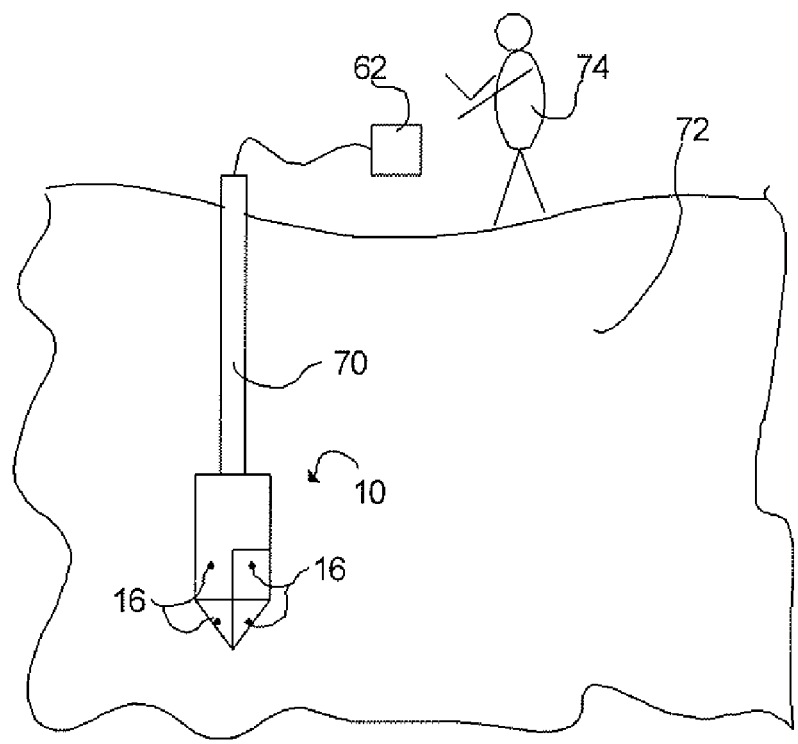
FIG. 6 is a schematic of the device of FIG. 1 inserted in a material sample.

The present invention is directed to systems and methods for modeling material behavior. A preferred embodiment of the invention is directed to method for modeling material behavior that includes using a testing device to induce a non-uniform state of stress and strain in a material sample and to measure data with the testing device. The data is then used to train a self-organizing computational model to learn non-uniform stress and strain behavior of the material. Other aspects of the present invention are directed to devices for obtaining the empirical stress and strain data. The devices include field testing devices and methods, laboratory testing devices and methods, and field observation methods.

It will be appreciated that methods and devices of the invention lend themselves well to practice in the form of computer program products. For example, a method or device of the invention may include a computer program product that causes a processor-based device to carry out steps of a method of the invention or to operate as a device of the invention. Accordingly, discussion herein of systems, devices, and methods of the invention will be understood to also describe program products where appropriate.

A. Field Testing Devices

One aspect of the present invention is directed to a field testing device for obtaining stress and strain data from field material samples, such as soil. FIGS. 1-5 illustrate an exemplary penotrometer testing device of the invention generally at 10. The penotrometer 10 includes a body 12 that is generally cylindrical shaped. A generally cone-shaped penetrating end 14 forms an end of the body 12. A plurality of sensors 16 are arranged along the body 12, with some positioned on the penetrating end 14. The sensors 16 may be useful to measure strain, stress, displacement, force, or the like, and may in practice include transducers.

A section 18 of the penotrometer 10 is movable, as best illustrated by FIGS. 4-5. The section 18 includes at least a portion of the penetrating end 14 having a sensor 16. The section 18 is movable in a direction along the major axis of the cylinder shaped body 12. As best shown by the cross section of FIG. 5, the body 12 contains a drive 50 that is connected by a mechanical linkage 52 to the movable section 18. The movable section 18 has a side wall 54 that is slidable along a body wall 56 and an end wall 58 slidable along an edge 60 of the penetrating end 14 so that as the section 18 is moved in either direction along the major axis, the body 12 remains sealed.

The drive 50 and the mechanical linkage 52 may include combinations of gears, chains, hydraulic fluids, chambers and pistons, and the like that are operable to cause the section 18 to move. A power supply (not shown) for powering the drive 50 may be an AC, DC, universal, or the like. Preferably the drive 50 is operable to move the moveable section 18 a known distance D.

FIG. 5 also illustrates a connection 60 that links the drive 50 and the sensors 16 to a controller 62. The connection 60 may be a flexible wire, cable, or the like. Portions of the connection 60 that connects to the sensors 16 on the movable section 12 should be flexible and allow for movement of the section 18. A wireless connection 60 is also contemplated. Also, although the connection 60 has been illustrated as a single multi-branched connection, a plurality of individual connections may also be used. The controller 62 may be a processor-based device such as a computer, hand held device, electrical device, a program code running on a computer, or similar device.

Figure 7:
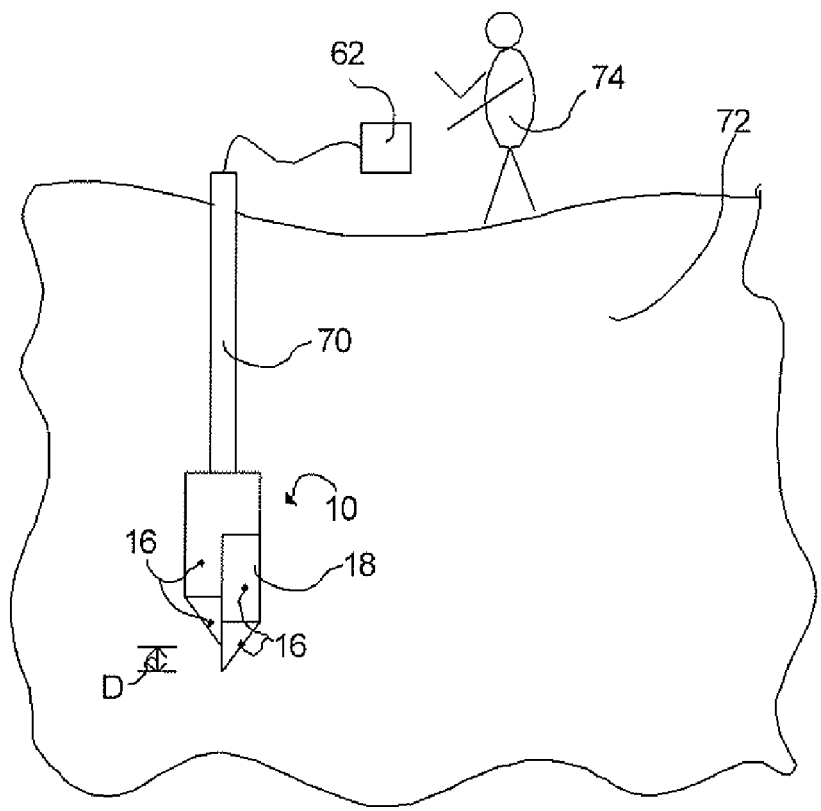
FIG. 7 is the view of FIG. 6 with the device's moveable section extended.

The schematic diagrams of FIGS. 6 and 7 will be useful to describe operation of the penotrometer 10. The penotrometer 10 is adapted for connection to a bore 70 operable to drive the penotrometer into a material sample 72 such as soil. The bore 70 may be a drill rig, a special purpose driver, or similar device. A drive (not illustrated) may be provided for powering the bore 70. Control of the bore 70 may be had by an operator 74 through the controller 62, through a separate dedicated bore controller, or by a similar device. The bore 70 may be controlled by the operator 74 to deliver the penotrometer to a desired position or depth into the material 72, and to move the penotrometer at a desired speed though the material 72. As best shown by FIG. 7, once at a desired position, the operator may also manipulate the controller 62 to cause the moveable section 18 to slide outward (e.g., downward in the orientation of FIG. 7).

Through these and other operations, the penotrometer 10 of the invention is useful to collect a variety of valuable stress and strain data. While the penotrometer 10 is moving through the material sample 72, some of the sensors 16 arranged along the cylindrical sidewall portion of the body 12 may be used to measure sleeve friction data. Sensors 16 arranged along the cone shaped penetrating end 14 may be used to measure tip resistance data. Some of the sensors 16 may also be used to measure pore water pressure.

Figure 8:
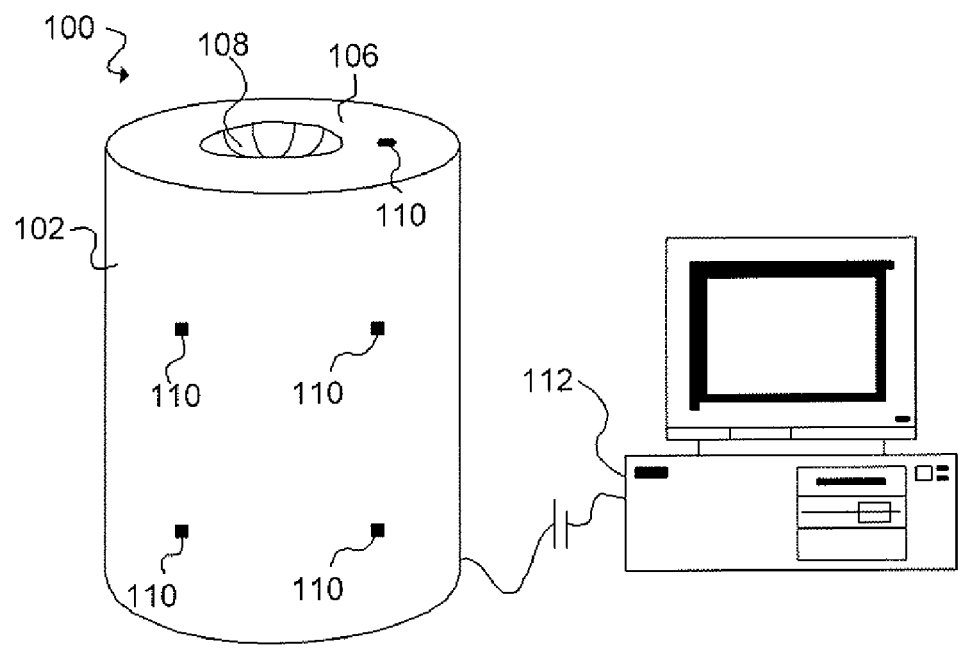
FIG. 8 is a schematic perspective of a preferred embodiment laboratory testing device of the invention.

Importantly, the penotrometer 10 of the present invention is also useful to collect data that can be used to characterize the material's response to non-uniform states of stress and strain. This is accomplished partly through movement of the penotrometer moving section 18. When the penotrometer 10 is in a stationary position and the moving section 18 in a retracted position, as illustrated by FIG. 7, a first set of data may be collected using at least some of the sensors 16. As shown by FIG. 8, the moveable section 18 is then moved a predetermined distance D to an extended position while the remainder of the penotrometer 10 remains stationary. The distance D will vary depending on application parameters. For many soil testing applications, by way of example, a distance of between about 1 and about 5 inches is believed useful. After the movement of the moving section 18 a second set of data is collected by the sensors 16.

Through these movements, a non-uniform and three-dimensional state of stress and displacement may be induced. Through knowledge of the distance D and the geometry of the moving section 18 and the penotrometer 10, these two sets of data may be interpreted to develop a model of the non-uniform stress and strain behavior of the material sample 72 through a method of the invention.

Those knowledgeable in the art will appreciate that the penotrometer 10 of FIGS. 1-7 represents one preferred embodiment of the invention only, and that many additional embodiments and configurations are possible. For example, invention embodiments are contemplated in shapes other than the general cone-tipped cylinder of the penotrometer 10. More than one wall may be movable. Also, other invention embodiments may include more than one moving section 18. Referring to the general cone-tipped cylinder shape of the penotrometer 10 by way of example, the penotrometer could include three, four, five, or more movable sections. Further, the present invention is not limited to a section movable along the major axis or a single axis.

B. Laboratory Testing Devices

Figure 9:
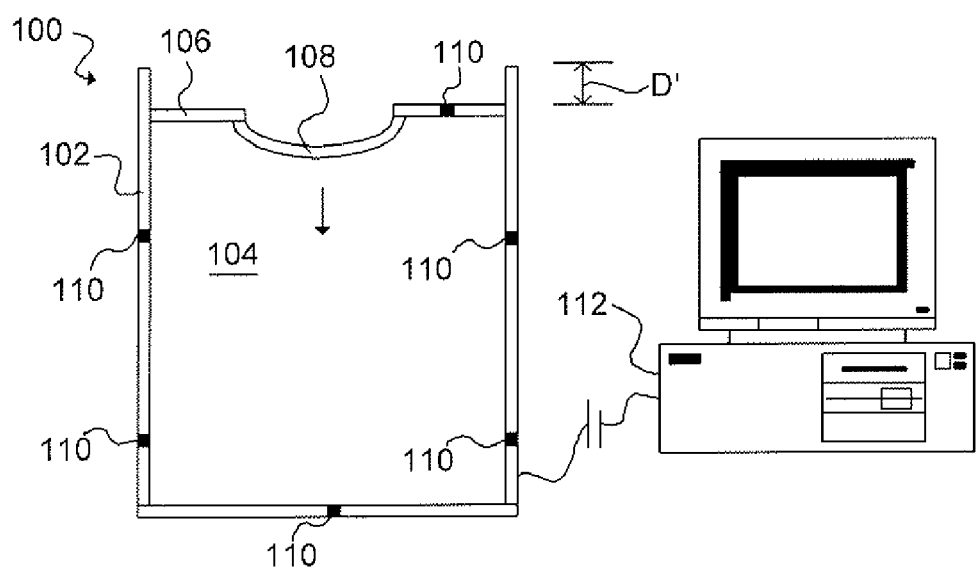
FIG. 9 is a schematic cross section of the device of FIG. 8.

An additional aspect of the invention is directed to laboratory devices useful for measuring stress, strain, force, displacement, and like data for a material sample. FIGS. 8-9 illustrate one preferred embodiment of a laboratory testing device 100 of the invention. The device 100 is generally cylindrical shaped, and includes a body 102 that defines an enclosure 104 (FIG. 9) for containing the material sample. An end wall 106 is movable into the enclosure 104 as generally indicated by the arrow of FIG. 9. A plurality of sensors 110 is arranged along the device body 102, with at least one of the sensors 110 preferably on the movable end wall 106. One or more additional sensors (not illustrated) may be placed interior to the sample. The sensors 110 may be operable to measure displacement, stress, strain, force, and similar properties, and may in practice comprise transducers.

A controller such as a computer 112 is connected to the testing device 100 for controlling movement of the end wall 106, for controlling the sensors 110, for recording data from the sensors 110, and the like. A drive (not shown) may be provided for driving movement of the end wall 106. When the end wall 106 moves inward into the enclosure 104, compression of the material sample contained therein occurs. The end wall 104 is moved a predetermined distance D' into the enclosure 104. This compressionary movement exerts a force on the boundary of the material and causes its displacement. At least some of the sensors 110 measure force at the material boundary while others measure displacement. Resultant data are recorded by the controller 112.

Importantly, the enclosure 104 includes an inclusion defined by the inverted dome 108 on the end wall 106. As used herein the term "inclusion" is intended to broadly refer to a formation or alteration that changes the volume of the enclosure 104. By way of example, the inverted dome 108 changes the otherwise smooth face of the endwall 106 and changes the volume of the enclosure 104. In operation, as the endwall 106 compresses the enclosure 104, the inverted dome 108 induces a non-uniform and three dimensional state of stress and strain in the material sample contained in the enclosure 104.

The sensors 110 may be used to collect displacement, force and like data useful to characterize the non-uniform three dimensional state of stress. In particular, one or more of the sensors 110 may be used to measure data with the end wall 106 in a first position, and then subsequently used to measure data at a second time when the end wall 106 is in a second position. One or more of the sensors 110 may also be used to dynamically measure data during movement of the end wall 106. Through knowledge of the distance D', the geometry of the enclosure 104 and of the inverted dome 108, and measured boundary forces and displacements, a model of a non-uniform stress and strain for the material sample can be developed through a modeling method of the invention.

Those knowledgeable in the art will appreciate that the laboratory device 100 is only one preferred embodiment of the invention, and that many variations may be made within the scope of the invention. For example, the device of the invention is not limited to a general cylinder shape. Also, the inverted dome 108 of the device 100 could take many alternative forms. Other three dimensional geometric shapes such as pyramids, cubes, other polygons, and the like may be used. It is also contemplated that as an alternative to being a generally convex shape that extends outward form the end wall 106 into the material sample, other useful inclusions may include concave shapes that expand the volume of the enclosure 104.

Figure 10:
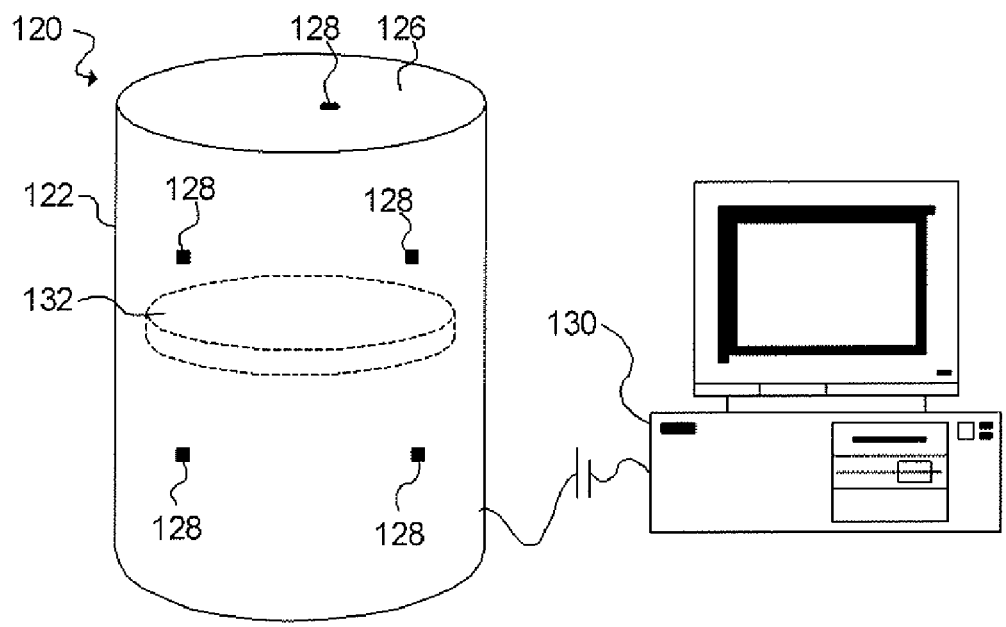
FIG. 10 is a schematic perspective of a second preferred embodiment laboratory testing device of the invention, partly in phantom.
Figure 11:
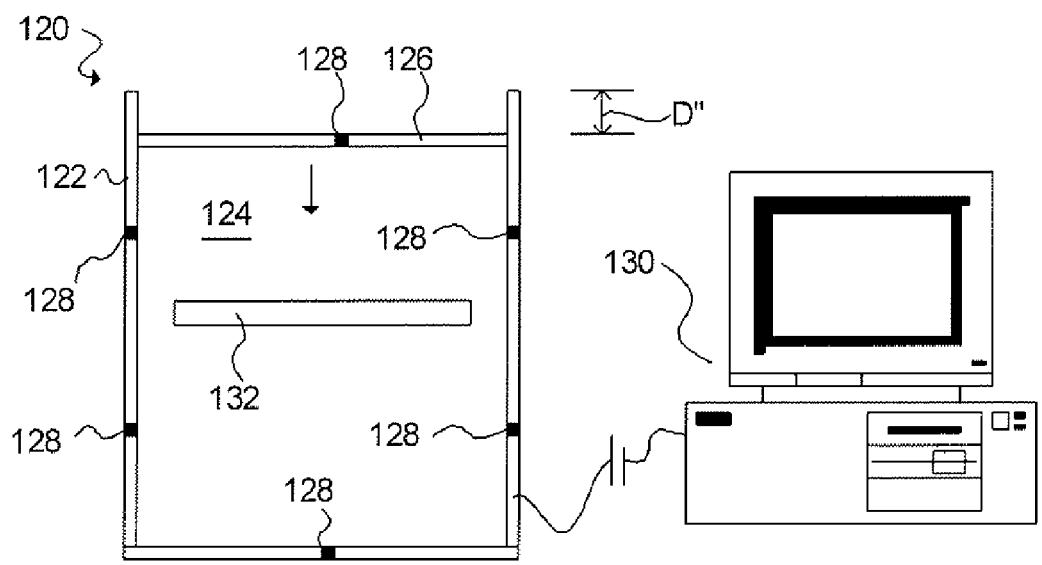
FIG. 11 is a schematic cross section of the device of FIG. 10, FIG. 12 schematically illustrates a simple neural network.

By way of additional example, FIGS. 10-11 illustrate another preferred laboratory testing device 120 of the invention. The device 120 is consistent in many ways with the device 100 of FIGS. 8-9. It includes a generally cylindrical body 122 that defines an enclosure 124 (FIG. 11) for containing a material sample to be tested. An end wall 126 defines an end of the cylindrical body 122, and is movable by a known and predetermined distance D" into the enclosure 124 (FIG. 11). A drive (not shown) may be provided for moving the wall 126. A plurality of sensors 128 are arranged on the device body 122, and are useful to measure one or more of strain, displacement, force, stress and like properties of a material sample that is contained in the enclosure 124. A controller 130 that may be a computer or other processor-based device is provided for controlling the moveable wall 126, for controlling the sensors 128, and for recording data from the sensors 128.

Like the device 100 of FIGS. 8-9, the device 120 also includes an inclusion 132 useful to induce a non-uniform state of stress and strain in a material sample in the enclosure 124 under the compression of the moving wall 126. Unlike the inclusion 108 of the device 100, however, the inclusion 132 is not attached to the body 122 but instead free-floating in the material sample. The inclusion 132 is generally shaped as a three dimensional disk. Preferably it is substantially incompressible when exposed to pressures expected to exist in the enclosure 124.

The presence of the inclusion 132 in the body of the material sample in the enclosure 124 induces a non-uniform state of stress and strain in the sample in generally the same manner as the inclusion 108 of FIG. 8-9. To characterize the non-uniform stress and strain, the controller 130 can cause measurements to be taken by the sensors 128 when the movable wall 126 is in a first position and then subsequently taken a second time when the wall 126 is in a second position. With the knowledge of the dimensions and geometry of the enclosure 124, the inclusion 132, the distance D", in addition to measured boundary forces and displacements, a model can be developed for non-uniform states of stress in the material using a modeling method of the invention.

It will be appreciated that although the inclusion 132 has been illustrated as a three-dimensional disk, other free-floating inclusion shapes will be useful in the practice of the invention. Other shapes may be desirable depending on particular experiment purposes. For instance, it may be desirable to expose the same material sample to testing using differently sized/shaped inclusions. By way of example and not limitation, a substantially flat inclusion may be used, such as a sheet of metal or the like. Other three dimensional inclusions may also be used, with examples including but not limited to cubes, rectangles, spheres, pyramids, and the like. Irregular shaped inclusions are also contemplated.

It may also be useful to know the position of the free floating inclusion 132 in the material sample. This may be accomplished through use of a guide structure that may be useful to locate the inclusion in a known first position. An exemplary guide structure may include a wire or other thin support attached to a wall of the body 122 that can be used to place the inclusion at a precisely known position in the inclusion.

C. Self-organizing Computational Modeling Method

In addition to field and laboratory testing devices and methods, the present invention is also directed to a method for extracting a non-uniform material stress strain behavior from empirical data through use of a self-organizing computational model. As used herein, the term "self-organizing computational model" is intended to broadly refer to self-learning algorithms that can iteratively change to "learn" a solution to a problem. Several self-organizing computational models will be suitable for practice of the invention, with examples including evolutionary computational models, genetic algorithms, neural networks, and the like. The preferred self-organizing model is a neural network.

Neural networks are massively parallel computational models for knowledge representation and processing. They are capable of learning complex non-linear relationships and associations from a large body of data, and they have many desirable characteristics for engineering applications: they are robust, they are noise and fault-tolerant, they are self-organizing and adaptive, and they are capable of generalizing.

A simple neural network is schematically illustrated in FIG. 12. This simple neural network is formulated in total rather than incremental form and might be used for modeling of materials that are not strongly path dependent, for example. It consists of several layers of computational nodes, or neurons; including, in this example, an input layer, two hidden layers, and an output layer. Three strain variables ($\epsilon 1$, $\epsilon 2$, and $\epsilon 3$), which might for example represent the strain components in a 2-D continuum, are input and a forward pass through the network involving only very simple computations results in the prediction of three corresponding stress variables (P1, P2, and P3) at the output layer.

Each neuron in a given layer is connected to every neuron in the next layer, and each such connection has a connection weight associated with it; the knowledge stored in the neural network is represented by the set of connection weights. The neural network may be trained by presenting it with a comprehensive set of training cases. For example, a set of strain variables and the set of corresponding correct stress variables may be used. The connection weights are appropriately modified until the predicted stress variables agree satisfactorily with the correct stress variables.

A preferred method of the invention includes the step of training the neural network based model using empirical three dimensional stress and strain data that is obtained using a testing device that has induced a non-uniform state of stress and strain. The testing device may for example be a laboratory or field testing device of the invention. Accordingly, the empirical data is not used "directly" in modeling the material behavior, but is instead used as training data to teach a neural network based model. If the training data contains enough relevant information, the trained neural network can generalize material behavior to new loading cases.

Those skilled in the art will appreciate that training refers to the process of supervised learning during which training cases are presented to the neural network, and the connection weights are modified until correct results are obtained. Training is the adaptation process whereby neural networks adjust their connection weights so that they can produce the specified output in response to the specified input. This process may be thought of as a function mapping, that is, training is a procedure to develop a function, embedded in the connection weights, that can describe the relationship between the specified input and output. One advantage of neural networks function mapping is that it continuously adapts to new input and output. Once the neural network is trained, it can be used just as a conventional function. Use of a testing device of the invention to obtain training data ensures a comprehensive data set. The testing devices of the invention are useful to generate complex spatial patterns of stress and strain that are therefore rich in information.

Neural network training procedure can be thought of as equivalent to determining a conventional function that involves three major steps: a) observing the given data, b) choosing approximate function, and c) calibrating parameters of the function in conventional mapping function creation. The training data should implicitly contain the essential knowledge that describes the material behavior if the neural network is to be able to predict that full range of behavior. That is, the set of training cases should constitute a comprehensive set.

Those skilled in the art will appreciate that there are numerous appropriate methods for training a self-organizing computational model such as a neural network. In the preferred method of the invention, an autoprogressive training methodology is used. The autoprogressive training procedure is discussed in detail in "Autoprogressive Training of Neural Network Constitutive Models," by J. Ghaboussi, D. Pecknold, M. Zhang, and R. Haj-Ali, Int. J. Num. Meth. Eng. 42, p 105-126 (1998). The autoprogressive training methodology provides an advantageous process for training a neural network to "learn" a global solution to a boundary value problem using only "local" boundary values. Thus neural network training exercises that might otherwise require training data from a large number of tests representing global values may be carried out with only one or a few tests using the autoprogressive training procedure.

Autoprogressive training is a process in which the neural network is itself an integral part of the iterative algorithm that is used to create the stress strain training cases from the empirical data. These stress strain training cases evolve, or progress, during this process: initially, they do not accurately represent the true material behavior. As the iterative process continues, the quality of the training cases improves. An important part of the training protocol therefore involves appropriately pruning the training set to reflect this evolution.

In order to illustrate the autoprogressive training algorithm, a hypothetical example is considered in which a one dimensional neural network stress strain model is developed using a structural response data for a simple truss having a plurality of individual members. The global response of the truss structure may be summarized as the horizontal displacement U at one side of the truss as a load P is applied to the other side. From this data, it is desired to train a neural network to learn the stress strain behavior of the individual members of the truss.

For purposes of this explanatory example, a finite element simulation is used to create hypothetical structural response data shown in FIG. 13. An analytical model was used to represent the 1-D stress strain behavior of the truss elements in a conventional non-linear structural analysis to compute the load vs. deflection response shown.

For this example, a simple neural network representation that uses the truss element current axial strain $\epsilon$ as input, and the current axial stress $\sigma$ as output, as illustrated in FIG. 14, is sufficient. Therefore the input layer has one node and the output layer has one node. Two hidden layers are used, with adaptive determination of the number of nodes in the hidden layers. Two nodes are assigned to each hidden layer at the beginning of training, and this number gradually increases as needed as shown in FIG. 14B. In order to compactly describe the architecture of a neural network material model, the following general notation is used:

$\sigma = \sigma NN\{$input parameters; neural network architecture$\}$

Where NN denotes the output of a multi-layer feed forward neural network, and the notation indicates that the stress $\sigma$ is the output of the neural network. The first argument field specifies the input to the neural network, including loading history information if appropriate; the second argument describes the neural network architecture, i.e. the number of nodes in the input layer, the hidden layers, and the output layer, respectively, and its training history. Thus the specific neural network material model of FIG. 14 may be described as:

$\sigma = \sigma NN\{\epsilon; 1, 2\text{-}6, 2\text{-}6, 1\}$

This indicates that the neural network has four layers: an input layer with one node; two hidden layers; and an output layer with one node. The two hidden layers each have two nodes at the start of the training process, and each has six nodes after training is completed One preparatory step of training of the neural network material model is generally carried out in order to get the autoprogressive algorithm started. Rather than assigning random initial connection weights, it has been found convenient to initialize the neural network material model by pre-training it on a data set generated from a linear elastic constitutive model; this data set is retained in the training data generated during the incremental finite element simulation of the structural test.

In the case of the 1-D truss example, a plurality of pre-training cases was generated randomly to form the pre-training database. The neural network shown in FIG. 14 was pre-trained on 10 sub-sets of this pre-training database; each subset contained about 20 percent of the database. The pre-training process was divided into 10 separate stages; in each stage, the neural network was trained sequentially on three subsets, randomly selected from the subsets, until a selected error tolerance was satisfied. The connection weights were then updated; this constituted one training epoch. Each time the rate of learning fell below a selected level, without the overall convergence criteria having yet been met, one node was adaptively added to each hidden layer. Training began with 2 nodes per hidden layer, and terminated with four nodes per hidden layer. Thus the pre-trained neural network can be described at this stage by:

$\sigma = \sigma NN\{\epsilon; 1, 2\text{-}4, 2\text{-}4, 1\}$

To this point, all of the stress strain training cases represent true material behavior (in this case, linear elastic behavior).

In order to create the stress strain training data for the neural network material model, having knowledge only of the global load vs. deflection response of the structure, a Finite Element (FE) model of the structural test specimen may be constructed. This model is used to carry out an incremental non-linear analysis of the structural test, using a neural network to represent the material stress strain behavior. In this mode, termed forward analysis, no training takes place; the neural network is simply used in the same manner that a conventional analytical material model is used.

Clearly, if the neural network has been only partially trained, or not trained at all, such a forward analysis will not provide accurate structural level responses. The autoprogressive algorithm provides a method for using the error in the predicted structural level response to generate approximate stress strain information with which to carry out a cycle of training; a new iteration of forward analysis with the updated neural network material model then yields a new set of approximate, but presumably improved, stress strain training cases. This iterative process is continued at each discrete load level until the structural level response is predicted accurately enough by forward analysis.

The two phases of the autoprogressive algorithm are the forward analysis phase and the training phase. The forward analysis phase that is carried out at each measured load level $P_n$. It consists of two main steps, each of which is a non-linear FE analysis.

Step 1: Load Controlled Analysis. At the nth load increment, the measured load increment $\Delta P = P_n - P_{n-1}$ and the displacement increment $\Delta U$ is computed using:

$$K_t \Delta U_n = P_n - I_{n-1} \qquad \text{(Eqtn. 1)}$$

in the current neural network model; where $K_t$ is a tangent stiffness and the internal resisting force vector is computer from the stress at the end of the previous increment, which is in turn determined from the neural network by:

$$I_{n-1} = \Sigma \int B^T [\sigma_{n-1} NN(\epsilon_{n-1}, \sigma_{n-2}, \epsilon_{n-2}, \ldots; \ldots)] dv$$

In this example, history points $\sigma_{n-2}, \epsilon_{n-2} \ldots$ are not included in the chosen neural network representation. The behavior of the structure is in general non-linear, and the displacement increment $\Delta U$ may be solved for as a standard non-linear problem. If a conjugate gradient algorithm is used, the tangent stiffness $K_t$ need not be explicitly computed; alternatively, the tangent stiffness can be formed by computing element tangent stiffnesses via the neural network material model. This is done by computing the element tangent constitutive matrix, one column at a time, by using strain probes.

The iterative solution of Eqtn 1 is carried out in the usual way; for the jth iteration in the nth load increment, the following system of equations is formed:

$$K_t \delta U_n^j = P_n - I_n^{j-1} \qquad \text{(Eqtn. 2)}$$

$$I_n^{j-1} = \Sigma \int B^T [\sigma_n^{j-1} NN(\epsilon_n^{j-1}, \sigma_{n-1}, \epsilon_{n-1}, \ldots; \ldots)] dv$$

Eqtn. 2 is solved to determine the iterative correction $\delta U_n^j$ to the displacement increment, where $\epsilon_n^{j-1}$ is the current total strain, updated after iteration (j−1). Strain increments are computed at element integration points, the total strains are updated, and the stresses are updated by a forward pass through the neural network material model:

$$\sigma_n^j = \sigma_n^j NN(\epsilon_n^j, \sigma_{n-1}, \epsilon_{n-1}, \ldots, \ldots)$$

Iterations continue until specified convergence tolerances on, for example, the norm of the residual load (the right-hand side of Eqtn. 2) are met. When such convergence criteria are met, the stresses, strains and displacements are updated. The total stresses at this stage are denoted by $\sigma_{n-1} + \Delta\sigma_n$, the total strains by $\epsilon_{n-1} + \Delta\epsilon_n$, and the total nodal displacements by $U_{n-1} + \Delta U_n$.

The relevant subset of the computed displacement vector $U_n$, denoted by ($U_n$ vector), does not in general agree very closely with the measured displacements, denoted by ($U_n$ measured). The discrepancy, or error, is taken as:

$$\delta(U_n \text{ vector}) = \Delta(U_n \text{ measured}) - \Delta(U_n \text{ vector}) \quad \text{(Eqtn. 3)}$$

where accumulated displacement error from previous steps is ignored. If a prescribed convergence criterion, in terms of a selected norm of $\delta(U_n$ vector) is met, then the stresses and strains are added to the training data set, and a training cycle begins during which the neural network connection weights are modified. In the early stages of training, of course, the convergence criterion on $\delta(U_n$ vector) will generally not be met; Step 2 of the autoprogressive algorithm is then undertaken.

Step 2: Displacement Controlled Analysis. The displacement error, Eqtn 3, is applied as an imposed structural boundary condition. This is considered as an additional incremental step from the current configuration. Iterations are carried out as usual until specified convergence tolerances are met, as in Step 1; the final strain increments $\delta\epsilon_n$ at the integration points are then computed and stored.

Collection of Training Cases: New stress strain sets, consisting of stresses determined from Step 1, and corresponding strains, computed from Step 1 and corrected with strain increments from Step 2 are collected. That is, the stresses are $\sigma_{n-1} + \Delta\sigma_n$ and the corresponding strains are $\epsilon_{n-1} + \Delta\epsilon_n + \delta\epsilon_n$.

Training phase of the autoprogressive algorithm: Once Steps 1 and 2 have converged at load step n, the newly collected training cases are temporarily added to the training database, and a cycle of training and update of neural network connection weights follows. This entire process, i.e. Steps 1 and 2, followed by a training cycle and update of neural network connection weights, is termed a local iteration. At each new local iteration, the training cases ($\sigma_{n-1} + \Delta\sigma_n$, $\epsilon_{n-1} + \Delta\epsilon_n + \delta\epsilon_n$) that are collected replace in the training database those that were generated in previous local iterations at load step n. Local iterations are continued until the selected convergence criterion on $\delta(U_n$ vector) (Eqtn. 3) is satisfied; that is, until Step 2 is not required.

Once this satisfactory agreement is achieved at load step n, the process is repeated for load step (n+1), and so on, until the full range of applied loads is covered. The term load pass is used to denote the application of this algorithm over the full range of applied loads. It is again noted that the stress strain training cases that are derived from this algorithm are not initially representative of the actual stress strain response of the material. For this reason, the complete training of the neural network material model may require several load passes. Eventually, with additional load passes, Step 1 of the autoprogressive algorithm produces fields of stress strain pairs that are more nearly consistent with the measured structural load vs. displacement responses, the structural displacement correction that is applied in Step 2 gradually becomes smaller and smaller, and convergence is declared.

As the autoprogressive algorithm proceeds from one load increment to the next, a set of stress strain training pairs is collected at each load step from the converged solution. At the conclusion of one load pass, therefore, the entire training database consists of a subset of the pre-training cases plus one set of training cases for each load step. Because the connection weights are updated periodically during the load pass, these different sets of training cases actually correspond, in effect, to different material models. Generally, the most recently collected sets most faithfully represent the actual material behavior. Therefore, preferably some strategy is adopted to either retire or correct the older training sets. One elective strategy that has been developed is to use a moving window to select only those training sets that were collected over a specified small number of prior load steps.

In addition, in more complex material modeling situations that involve multiaxial path-dependent behavior, where it is necessary to include stress path information in the neural network input, additional measures may be useful to ensure that the stress path information is consistent with the current material model.

Figure 15:
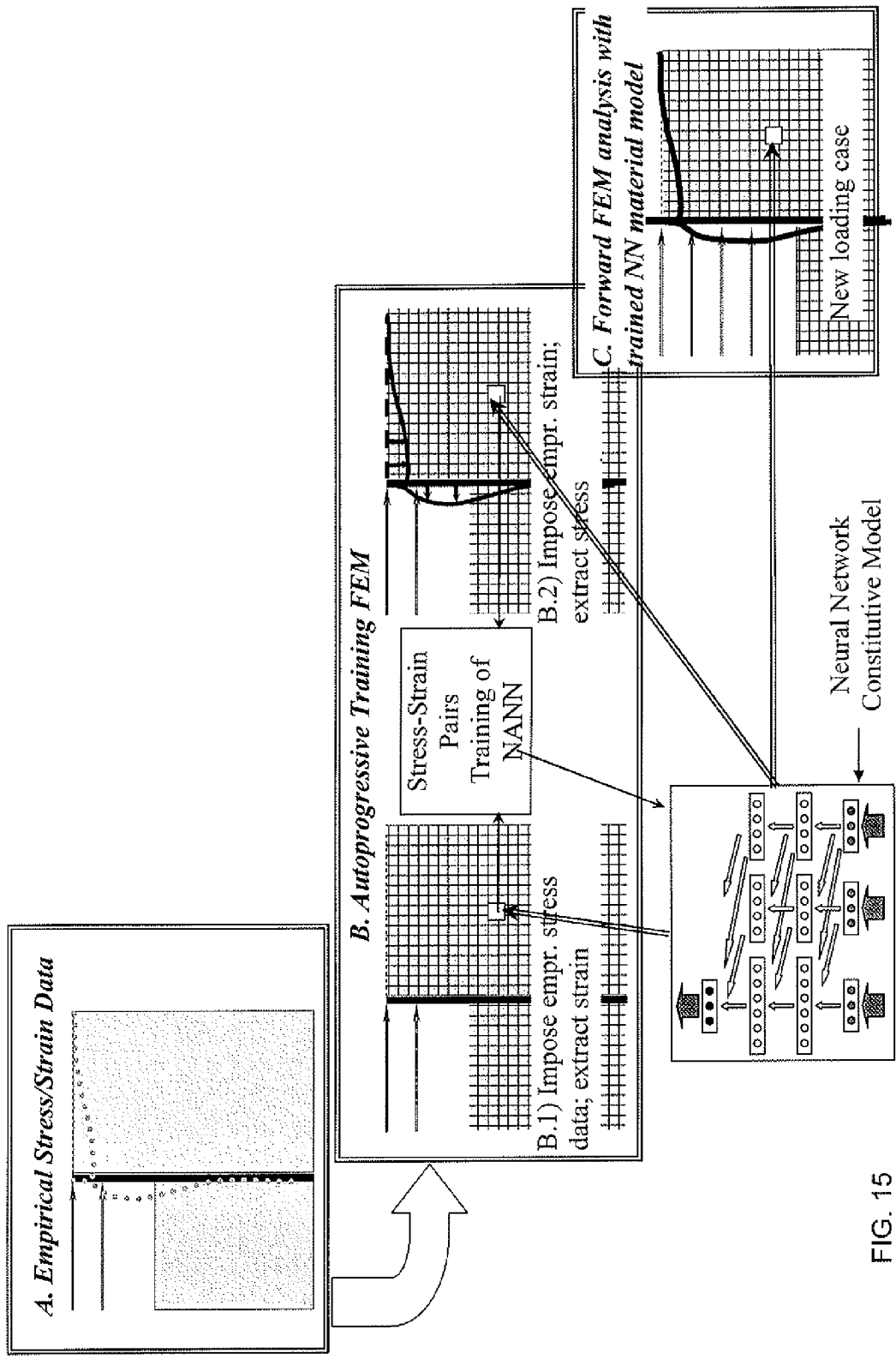
FIG. 15 is a schematic illustrating autoprogressive training.

The schematic of FIG. 15 is useful in generally describing the use of the autoprogressive training method as contemplated in a preferred method of the invention. At step A, empirical stress strain data is obtained under non-uniform conditions. At least two complimentary sets of measured boundary conditions, where each set includes either forces or displacements at the boundaries, are obtained using, for example, a testing device of the invention. Initially the soil response is unknown and the neural network soil model is trained using stress strain data that reflect linear elastic response over a limited strain range. This avoids starting with a randomly initialized neural network that does not reflect a realistic material constitutive behavior.

In step 15 B of the exemplary autoprogressive training method of FIG. 15, a parallel FE analysis using the same neural network material model is performed whereby the measured stress and strain data are imposed as additional displacement boundary conditions. The methodology stipulates that in this FE analysis, since the applied boundary displacements are accurate, the corresponding computed equilibrium strain field provides an acceptable approximation of the actual strain field experienced by the soil. As shown generally at step B of FIG. 15, the parallel approach generally includes imposing an empirical stress measurement in a first neural network analysis to extract a strain (step B.1), and imposing an empirical strain measurement in a second neural network analysis to extract a stress (step B.2).

The stress data from analysis of step 15 A and the strain data from analysis of step B are extracted to form stress-strain pairs that approximate the field soil constitutive response. The neural network soil model is trained using these stress-strain pairs. The analyses of step B and the subsequent neural network material model training are referred to as an autoprogressive training cycle. The analyses of step B are repeated using the updated neural network soil model and a new set of stress-strain data is extracted for re-training of the neural network soil model in additional autoprogressive training cycles.

The solution converges when the analysis of step 15 B.1 provides the correct strain, and step 15 B.2 provides the correct stress. That is, when the modeled results converge at the measured values. Several autoprogressive training cycles are generally performed. This results in a single autoprogressive training pass. Several training passes are usually needed to develop a neural network material model that will adequately capture measured deformations in an FE analysis. Care should be exercised in choosing the number of autoprogressive training cycles and passes and the neural network training scheme. It is preferable that a small number of autoprogressive training cycles be used in the first few passes to allow the neural network material model to learn the full range of stress-strain response. This will prevent problems associated with early over training of the neural network material model.

It is noted that the procedure illustrated in FIG. 15 proposes that the analyses of steps 15 B.1 and B.2 be performed in parallel. Although these steps could alternatively be performed in series, parallel is preferred to limit or avoid large displacement correction in the analysis and potential introduction of stress and strain path reversal that is merely an artifact of the analysis. This issue becomes important, for example, when soil response is highly non-linear and path dependent.

Figure 16:
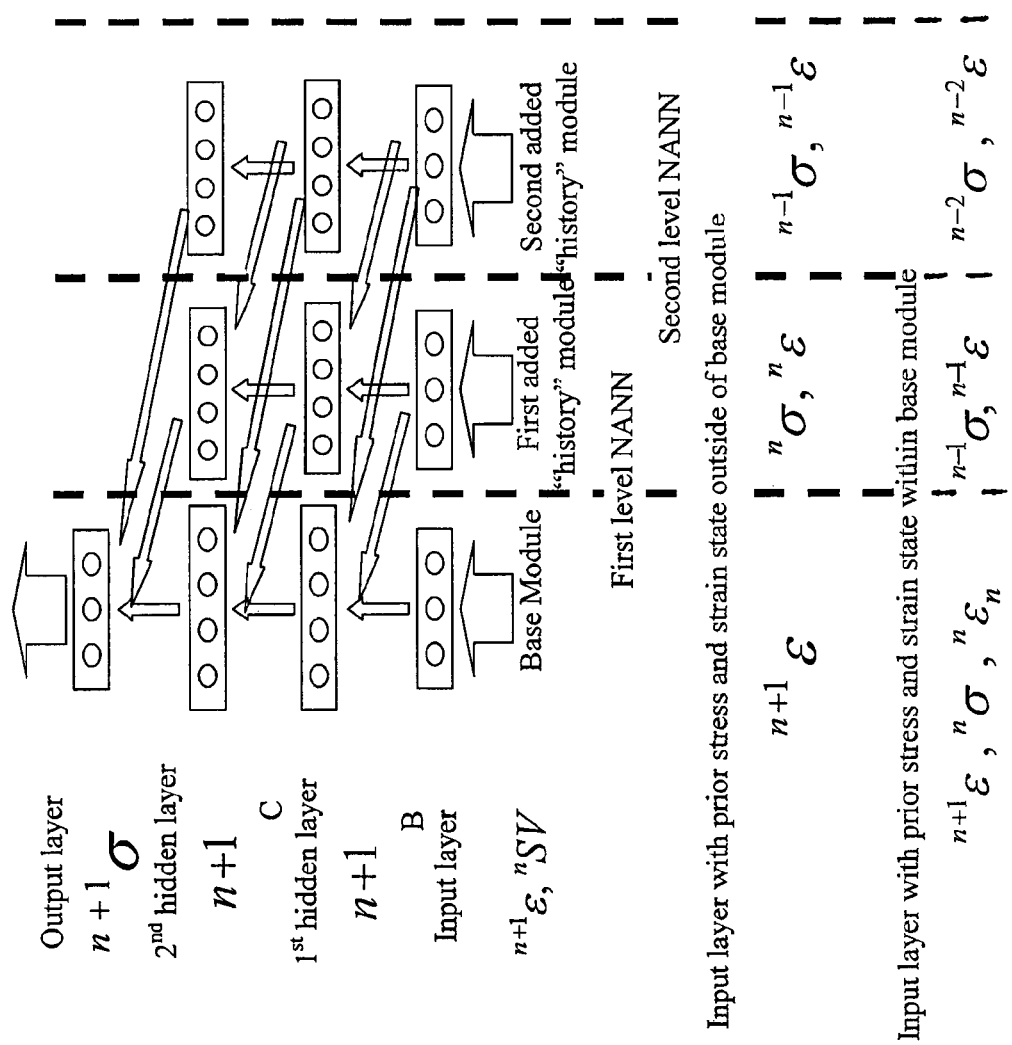
FIG. 16 is a schematic of a preferred embodiment neural network material model architecture of the invention.

A preferred method of the invention also includes steps of using a nested adaptive neural network (NANN) architecture is used for representing soil constitutive behavior. NANN, with an example shown in FIG. 16 is a modification of the standard multi-layer, feed forward neural network, also called back-propagation neural network. The artificial neurons are arranged in layers with all neurons in each layer having connections to all neurons in the next layer and the interaction with each other is via weighted connections, which represent numerical values assigned to the connections between the artificial neurons. The NANN consists of a total of four layers.

The input layer includes the strain vector and other relevant state variables (SV), and the output layer provides the stress vector. The two hidden layers are assigned an initial number of nodes, which can increase (i.e. adapt) to better fit the training data. For nonlinear material behavior, knowledge of loading history is needed to accurately capture material response. "History" modules can be added to include prior stress-strain states as additional input nodes. The following describes the governing equations of an exemplary NANN material model of the present invention.

The input layer consists of the updated strain vector $\epsilon_i$ and the current state variables $SV_j$. The state variables can represent prior stress and strain states or other quantities deemed relevant to capture material behavior. In the first layer the strain vector may be scaled by an appropriate scaling factor:

$$\epsilon_i^{NN} = \frac{\epsilon_i}{S_i^\epsilon} \text{ such that } -1 < \epsilon_i^{NN} < 1 \quad \text{(Eqtn. 4)}$$

The nodes of the first hidden layer are related to the nodes of the input layer using a set of connection weights:

$$B_i = \tanh\left(\beta\left[\sum_{j=1}^{N\epsilon} w_{ij}^{B\epsilon}\epsilon_j^{NN} + \sum_{j=1}^{NSV} w_{ij}^{BSV} SV_j\right]\right) \quad \text{(Eqtn. 5)}$$

where:
N$\epsilon$: Number of input strain nodes
$w_{ij}^{B\epsilon}$: connection weight between input node strain $\epsilon_j$ and $1^{st}$ hidden layer node $B_i$
$\beta$: constant for the sigmoid function tan h NSV: Number of state variable nodes
$w_{ij}^{BSV}$: connection weight between input node state variable $SV_j$ and $1^{st}$ hidden layer node $B_i$ State variables ($SV_j$) that represent strain and stress quantities are scaled in accordance with Eqtn. 4 and Eqtn. 5, respectively.

The nodes of the second hidden layer of the exemplary NANN of the invention are similarly related to the nodes of the first hidden layer using another set of connection weights:

$$C_i = \tanh\left(\beta\left[\sum_{j=1}^{NB} w_{ij}^{CB} B_j\right]\right) \quad \text{(Eqtn. 6)}$$

NB: Number of $1^{st}$ hidden layer nodes B
$w_{ij}^{CB}$: connection weight between $1^{st}$ hidden layer node $B_j$ and $2^{nd}$ hidden layer node $C_i$ The nodes of the output layer, which represent the scaled stress vector, are related to the nodes of the second hidden layer using another set of connection weights:

$$\sigma_i^{NN} = \tanh\left(\beta\left[\sum_{j=1}^{NC} w_{ij}^{\sigma C} C_j\right]\right) \quad \text{(Eqtn. 7)}$$

NC: Number of $2^{nd}$ hidden layer nodes C
$w_{ij}^{CB}$: connection weight between $2^{nd}$ hidden layer node $C_j$ and output layer node stress $\sigma_i$ The stress vector is then calculated from the scaled stress vector using the following equation:

$$\sigma_i = S_i^\sigma \sigma_i^{NN} \text{ where } -1 < \sigma_i^{NN} < 1 \quad \text{(Eqtn. 8)}$$

In methods and systems of the invention, NANN material models can be made to describe a specific material behavior by training the neural network using a set of data that contains material specific stress-strain pairs as well as related state variables. For a NANN material model each data set contains strains and related state variables that are fed to the neural network input nodes, and are then forwarded to the output, stress, nodes. These neural network stresses are compared with target stresses to calculate the error. Connection weights of the network are updated while the errors are back-propagated. Hence, multi-layer neural network is often called back-propagation neural network.

For a NANN model of the invention, the base module is first trained to capture approximate stress-strain relationships. Then, the first history module is added to consider the effect of loading history. Preferably, there are no connections from the base module to the first history module to eliminate the effect of later stress-strain states on previous stress-strain states (history). On the other hand, connections are added from the first history module to the base module, because later states are dependent upon the previous stress-strain states (history). When training the added first history module, the base module connection weights are fixed. More history modules can be added to capture highly nonlinear material behavior.

Many variations of the back-propagation processes have been proposed to update connection weights of the neural networks. The Rprop process as taught in "A Direct Adaptive Method for Faster Backpropagation Learning: The RPROP Algorithm," Riedmiller, M. and H. Braun, *IEEE International Conference on Neural Networks*. (1993) San Francisco: IEEE, New York: pp. 586-591, is an example of a back propagation process useful for training NANN models of the invention because of the algorithm's generally high reliability and relatively small number of control parameters.

Figure 17:
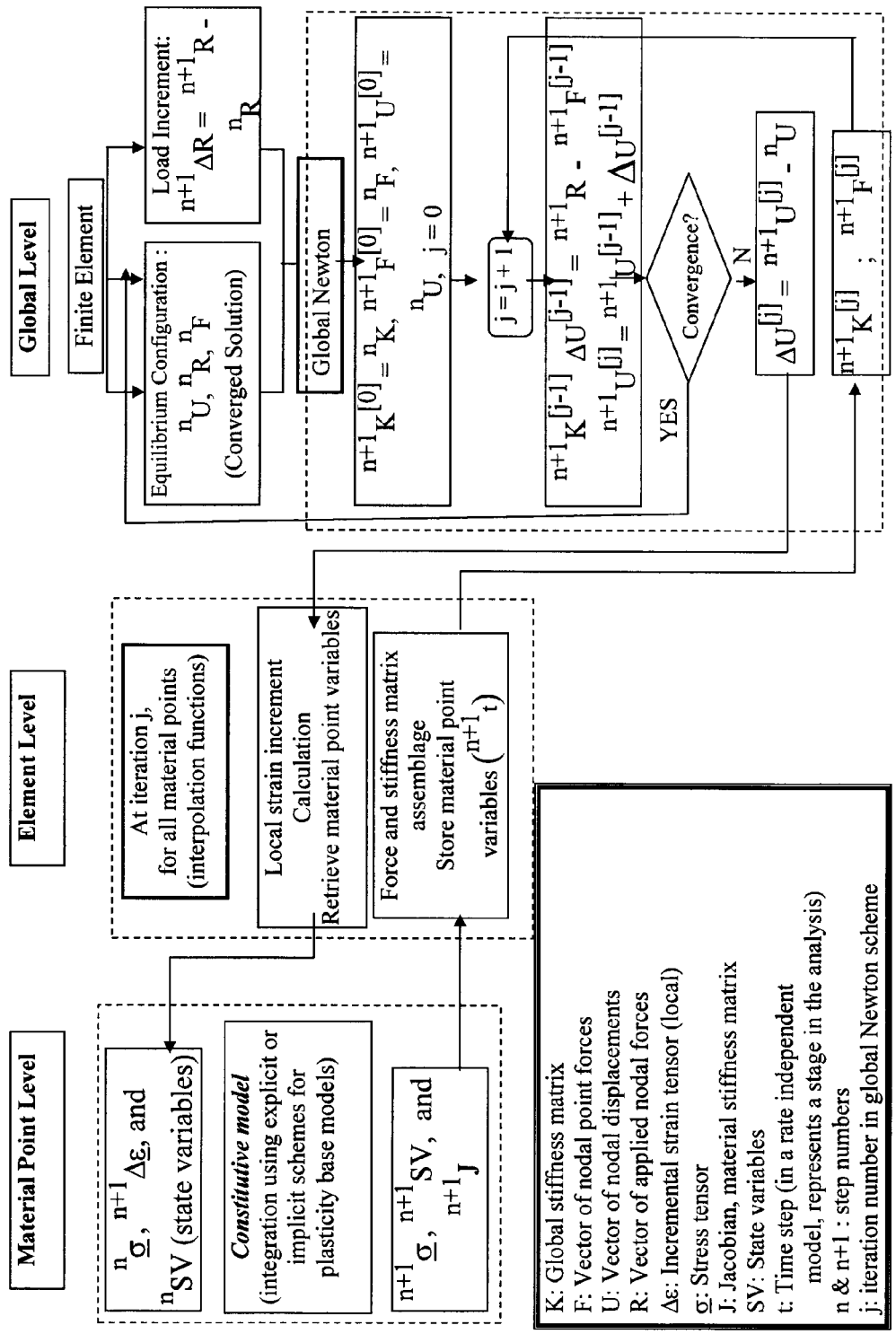
FIG. 17 is a flowchart illustrating a preferred embodiment method for including a finite element analysis in a neural network model of the invention.

Preferably, methods of modeling material behavior of the invention that use the neural network and NANN models also include a finite element (FE) analysis. A general schematic flow chart illustrating the relationship of an exemplary material constitutive model to the global solution of equilibrium equations in nonlinear finite element analysis is illustrated in FIG. 17. The FE model queries the material model module at each element integration point to provide an updated state of stress, history dependent state variables and material stiffness matrix given the current state of stress and strain, history dependent state variables and strain increment. The updated state of stress is used in developing the vector of nodal forces while the updated stiffness matrix is used in assembling the global stiffness matrix.

In incremental plasticity models the constitutive equations relate an infinitesimal strain increment, strain rate, ($d\underline{\varepsilon}$) with an infinitesimal stress increment, stress rate, ($d\underline{\sigma}$) in the form of constitutive differential equations. The FE material module has to provide material response over a finite strain increment ($\Delta \underline{\varepsilon}$) and therefore the material constitutive equations have to be integrated. The basic assumption for integration of rate constitutive equations over the increment $^{n+1}\Delta\underline{\varepsilon}$ is that the material response is proportional over this strain increment:

$$\Delta \underline{\varepsilon} = \int_n^{n+1} d\underline{\varepsilon} \qquad \text{(Eqtn. 9)}$$

Both implicit and explicit integration schemes have been used for numerical integration of elasto-plastic constitutive material models. For neural network based material models described by Eqtn. 1 through Eqtn. 8 and generally illustrated in FIG. 17, no integration procedure is necessary. The material constitutive model will directly provide an updated state of stress for a given updated state of strain or strain increment. This is advantageous numerically as it eliminates the errors associated with the use of a specific numerical integration scheme.

The material model in an FE analysis of the invention may provide the material stiffness matrix also known as the Jacobian. For infinitesimal strain increments (where $\Delta\underline{\varepsilon}\rightarrow d\underline{\varepsilon}$), J is the continuum Jacobian, $J_c$:

$$J_c = \frac{\partial(d\underline{\sigma})}{\partial(d\underline{\varepsilon})} \qquad \text{(Eqtn. 10)}$$

For elasto-plastic constitutive models this matrix is the elasto-plastic material matrix and is explicitly defined in model constitutive equations. The numerical solution of the nonlinear FE equations may be obtained iteratively by Newton-Raphson method or a number of other implicit and explicit methods as will be appreciated by those knowledgeable in the art.

The neural network model provides a relationship of stress to strain and the implied material stiffness matrix can be extracted from this relationship. The material stiffness matrix (Jacobian) can be written as follows:

$$\frac{\partial^{n+1}\Delta\sigma_i}{\partial^{n+1}\Delta\varepsilon_j} = \qquad \text{(Eqtn. 11)}$$

$$\frac{S_i^\sigma}{S_j^\varepsilon}\beta^3 \sum_{k=1}^{NC}\left(\left\{(1-(^{n+1}\sigma_i^{NN})^2)w_{ik}^{\sigma C}\right\}\left[\sum_{l=1}^{NB}\left\{(1-(^{n+1}C_k)^2)w_{kl}^{CB}\right\}\right.\right.$$

$$\left.\left.\left\{(1-(^{n+1}B_l)^2)w_{lj}^{B\varepsilon}\right\}\right]\right)$$

The above derivation demonstrates that a stiffness matrix can be derived for neural network material models of the invention. This stiffness matrix is dependent on the current state of the material and the strain increment. The matrix represents a consistent Jacobian obtained from the linearized material response over a desired strain increment. Eqtn. 11 represents an exact algorithmic linearization of the material stiffness matrix. The use of this matrix is believed to lead to efficient convergence of the Newton iteration in FE analysis useful for practice of the invention.

Methods and systems of the present invention contemplate that the neural network material model and proposed stiffness matrix can be used in a general FE analysis code using implicit methods such as the Newton-Raphson and similar methods. The proposed formulation and implementation is independent of the exact architecture of the neural network model and the training procedure.

The exemplary neural network constitutive model may be implemented in a general-purpose finite element code using the user defined material module or UMAT capability. Such an implementation makes it possible to use the exemplary material model in the solution of general boundary value problems. The implemented model is used in continuum stress analysis and rate independent static problems; therefore, the relevant convergence criteria of the global solution are related to nodal displacements and force residuals.

The derived material stiffness matrix for the neural network model shown in Eqtn 11 is independent of the specific material response learned by the neural network model. The stiffness matrix formulation can be used whether the neural network represents mildly or highly nonlinear material response. This is a distinct advantage over conventional elasto-plastic models whereby the material stiffness matrix has to be developed for each specific model.

The material stiffness matrix for an elasto-plastic constitutive model has characteristics directly related to the model formulation. The stiffness matrix is symmetric for a model with an associated flow rule and is asymmetric for a model with a non-associated flow rule. The flow rule is a mathematical idealization of measured or assumed material response. The mathematical formulation of a neural network material model does not explicitly account for symmetric or non-symmetric behavior. The neural network model learns the material behavior from the training data set provided. If the data set contains sufficient information about symmetric material behavior then the model will learn this behavior and the material stiffness will be symmetric, otherwise symmetry in the stiffness matrix is not guaranteed. It is believed that for an isotropic material the material behavior and consequently the stiffness matrix are symmetric. If the training data set does not contain sufficient information about material isotropic behavior, the training data set can be generalized to reflect the known material characteristic.

D. Field Observation Data Methods

Still an additional aspect of the present invention is directed to methods for using empirical three dimensional non-uniform field observation data to train a neural network based model to represent the field material. In practice, the neural network model discussed herein above, including its NANN and finite element aspects, will be appropriate for practice of field observation embodiments of the invention. Field observations may be made at construction sites where excavation, construction, or other activities are occurring, for instance, and may represent non-uniform strain, stress, force, and/or displacement data.

Measurements may be made over a period of time of days, weeks, months, or even years, depending on the application and scope of construction. By way of particular example, at a given excavation stage, the soil is excavated to a known depth and struts are placed to support the excavation wall. The measured deformations and the corresponding known excavation stage represent complementary sets of field observations. Similarly, as a building or other structure is built displacement of soil and other supports may occur. A steel beam supporting the base of the building, for example, may be displaced over time as the building is erected. Through methods of the invention, a self-organizing computational model of these and other problems will be developed to correctly represent the field observations. A preferred self-organizing computational model comprises a neural network consistent with that discussed herein with reference to other invention embodiments.

These field observation embodiments of the invention also contemplate use of an autoprogressive training method in combination with the preferred neural network model. The autoprogressive training method contemplated is consistent with that discussed herein above, except that the empirical training data includes field measurements or observations of actual material stress and strain instead of data obtained with a testing device.

It is intended that the specific embodiments and configurations herein disclosed are illustrative of the preferred and best modes for practicing the invention, and should not be interpreted as limitations on the scope of the invention as defined by the appended claims. For example, although discussion has been made herein of practice of the invention with soil, it will be appreciated that the invention will be beneficial when used with other materials, with examples including but not limited to granular materials such as sand, powders, grains, and the like.

What is claimed is:

1. A material testing device for penetrating into a sample of the material, the testing device including:
    a body configured for connection to a bore, the body having a surface and at least one movable section, said moveable section defining a portion of said surface and being movable relative to the remainder of said body; and,
    a plurality of sensors arranged on said surface, at least one of said sensors being disposed on said movable section and at least one of said sensors being disposed on the remainder of said body, at least one of said sensors comprising a strain sensor.

2. A testing device as defined by claim 1 wherein said at least one moveable section is slidably movable relative to the remainder of said body.

3. A testing device as defined by claim 1 and further including a drive contained in said body and connected to said at least one moveable section.

4. A testing device as defined by claim 3 wherein said drive is operable to move said at least one moveable section a predetermined distance.

5. A testing device as defined by claim 1 wherein said body has a major axis, and wherein said at least one moveable section is moveable along said major axis.

6. A testing device as defined by claim 1 wherein said body remains substantially sealed as said at least one moveable section is moved.

7. A testing device as defined by claim 6 wherein said body includes a cylindrical shaped body wall that remains substantially continuous as said moveable section is moved.

8. A testing device as defined by claim 1 and further including a controller linked to said at least one moveable section and to said plurality of sensors.

9. A testing device as defined by claim 1 wherein at least one of said plurality of sensors is configured to measure friction as said body moves through the material.

10. A testing device as defined by claim 1 wherein at least one of said plurality of sensors is operable to measure data at a first time when said at least one moveable section is in a first position and to measure data at a second time when said at least one moveable section is in a second position.

11. A material testing device for penetrating into a sample of the material, the testing device including:
    a body having a surface and at least one movable section, said moveable section defining a portion of said surface and being movable relative to the remainder of said body; and,
    a plurality of sensors arranged on said surface, at least one of said sensors being disposed on said movable section and at least one of said sensors being disposed on the remainder of said body, at least one of said sensors comprising a strain sensor, wherein said body has a penetrating end, at least one of said plurality of sensors being disposed on said penetrating end, and wherein said at least one moveable section defines at least a portion of said penetrating end.

12. A testing device as defined by claim 11 wherein said penetrating end is cone shaped.

13. A testing device as defined by claim 12 wherein said body is cylindrical shaped and has a major axis perpendicular to said penetrating end, wherein said at least one moveable section defines at least a portion of a wall of said cylindrical shaped body and defines at least a portion of said penetrating end, said moveable section moveable along the direction of said major axis.

14. A material testing device for penetrating into a sample of the material, the testing device including:
    a body having a surface and at least one movable section, said moveable section defining a portion of said surface and being movable relative to the remainder of said body; and,
    a plurality of sensors arranged on said surface, at least one of said sensors being disposed on said movable section and at least one of said sensors being disposed on the remainder of said body, at least one of said sensors comprising a strain sensor, wherein said at least one moveable section comprises a plurality of moveable sections.

15. A material testing device for penetrating into a sample of the material, the testing device including:
    a body configured for connection to a bore, the body having a surface and at least one movable section, said moveable section defining a portion of said surface and being moveable relative to the remainder of said body; and, a plurality of sensors arranged on said surface, at least one of said sensors being disposed on said moveable section and at least one of said sensors being disposed on the remainder of said body, at least one of said sensors comprising a strain sensor;

and further including a data processor for determining a non-uniform three-dimensional stress-strain model using data from said plurality of sensors.

16. A testing device as defined by claim 15 wherein said data processor includes a self-organizing computational model that learns a solution to a boundary value problem, said data from said plurality of sensors comprising said boundary value solution.

17. A laboratory testing device for measuring stress and strain of a material sample comprising:

a plurality of walls that define an enclosure for containing the material sample, at least a portion of at least one of said walls being moveable into said enclosure;

a plurality of sensors connected to said plurality of walls; and, a plurality of inclusions in said enclosure configured to induce a non-uniform state of stress in the material sample.

18. A laboratory testing device as defined by claim 17 wherein said plurality of inclusions are unattached to any of said walls.

19. A laboratory testing device as defined by claim 18 and further including a guide for placing said plurality of inclusions at a desired position in said enclosure.

20. A laboratory testing device as defined by claim 17 wherein said plurality of inclusions have shapes corresponding to one of a disk, a cube, a three dimensional rectangle, a sphere, a semi-sphere, a dome, or a pyramid.

21. A laboratory testing device as defined by claim 17 wherein said plurality of inclusions are substantially incompressible and have predetermined dimensions.

22. A laboratory testing device as defined by claim 17 wherein said moveable at least a portion of said wall is moveable by a predetermined distance.

23. A laboratory testing device as defined by claim 17 wherein at least one of said sensors is operative to measure strain, and wherein at least one of said sensors is operative to measure force.

24. A laboratory testing device as defined by claim 17 and further including a controller for controlling said sensors, for recording data from said sensors, and for causing said moveable at least a portion of said moveable wall to move.

25. A laboratory testing device as defined by claim 24 wherein said controller is operative to cause said sensors to measure first data at a first time with said moveable wall in a first position, and to cause said sensors to measure second data with said movable wall in a second position.

26. A laboratory testing device as defined by claim 17 and further including a data processor for using data from said plurality of sensors to develop a non-uniform stress and strain model for the material.

27. A laboratory testing device as defined by claim 26 wherein said data processor includes a self-organizing computational model, said data from said plurality of sensors used to train said self-organizing computational model.

28. A laboratory testing device as defined by claim 17 wherein said moveable at least a portion of said wall is operable to induce a non-uniform state of stress and strain in the material sample.

29. A laboratory testing device for measuring stress and strain of a material sample comprising:

a plurality of walls that define an enclosure for containing the material sample, at least a portion of at least one of said walls being moveable into said enclosure;

a plurality of sensors connected to said plurality of walls; and, at least one inclusion in said enclosure configured to induce a non-uniform state of stress in the material sample, wherein said inclusion is attached to one of said plurality of walls.

30. A laboratory testing device as defined by claim 29 wherein said inclusion is attached to said at least a portion of at least one of said walls.

31. A laboratory testing device as defined by claim 30 wherein said inclusion comprises a convex shape extending outward from said one of said plurality of walls.

32. A laboratory testing device as defined by claim 29 wherein said inclusion comprises a concave shape extending outward from said enclosure and into said one of said plurality of walls.

33. A laboratory testing device for measuring stress and strain of a material sample comprising:

a plurality of walls that define an enclosure for containing the material sample, at least a portion of at least one of said walls being moveable into said enclosure;

a plurality of sensors connected to said plurality of walls; and, at least one inclusion in said enclosure configured to induce a non-uniform state of stress in the material sample, wherein said enclosure is cylindrical shaped.

* * * * *

UNITED STATES PATENT AND TRADEMARK OFFICE
CERTIFICATE OF CORRECTION

| | | |
|---|---|---|
| PATENT NO. | : 8,095,344 B2 | Page 1 of 1 |
| APPLICATION NO. | : 12/250936 | |
| DATED | : January 10, 2012 | |
| INVENTOR(S) | : Jamshid Ghaboussi | |

It is certified that error appears in the above-identified patent and that said Letters Patent is hereby corrected as shown below:

On the Title Page:

In Item (57) Abstract, Line 10      Please delete "moved" and insert --moves-- therefor.

In the Specification:

| | |
|---|---|
| Col. 1, line 59 | After "models is", please delete "there" and insert --their-- therefor. |
| Col. 2, line 35 | After "conditions", please delete "may". |
| Col. 3, line 3 | After "empirical data", please delete "with the data". |
| Col. 4, line 37 | Before "to the sensors", please delete "connects" and insert --connect-- therefor. |
| Col. 6, line 35 | After "outward", please delete "form" and insert --from-- therefor. |
| Col. 10, line 37 | After "phase", please delete "that". |
| Col. 10, line 46 | Please delete "computer" and insert --computed-- therefor. |
| Col. 13, line 24 | Please delete "is used". |

Signed and Sealed this
Twenty-third Day of July, 2013

Teresa Stanek Rea
*Acting Director of the United States Patent and Trademark Office*